(12) United States Patent
Kim et al.

(10) Patent No.: US 11,379,068 B1
(45) Date of Patent: Jul. 5, 2022

(54) RADIO FREQUENCY SHIELDING USING A TOUCH ON ENCAPSULATION LAYER

(71) Applicant: Microsoft Technology Licensing, LLC, Redmond, WA (US)

(72) Inventors: Hyungsoo Kim, Seoul (KR); Hyun Woo Koo, Redmond, WA (US); Ying Zheng, Sammamish, WA (US); Vasudha Gupta, Fremont, CA (US); Rajesh Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/349,624

(22) Filed: Jun. 16, 2021

(51) Int. Cl.
*G06F 3/041* (2006.01)
(52) U.S. Cl.
CPC ........ *G06F 3/0412* (2013.01); *G06F 3/04164* (2019.05); *G06F 2203/04103* (2013.01)
(58) Field of Classification Search
CPC .............. G06F 3/0412; G06F 3/04164; G06F 2203/04103
See application file for complete search history.

(56) References Cited

U.S. PATENT DOCUMENTS

2017/0371452 A1\* 12/2017 Endo ............... G06F 3/0446

\* cited by examiner

*Primary Examiner* — Peter D McLoone

(57) ABSTRACT

The disclosure herein describes a display panel that includes a display area and a non-display area. The example display panel includes a flexible substrate, a touch metal layer, and a metal layer between the flexible substrate and the touch metal layer. Each of the display area and the non-display area include the flexible substrate, the touch metal layer, and the metal layer. The metal layer includes signal lines for transmitting signals between the display area and the non-display area. The non-display area includes a bending area with the touch metal layer being disposed on the metal layer in the non-display area to shield noise from signals transmitted through the signal lines in the bending area from the antenna. The display area includes light emitting diodes and a thin film encapsulation layer disposed between the touch metal layer and the metal layer.

20 Claims, 9 Drawing Sheets

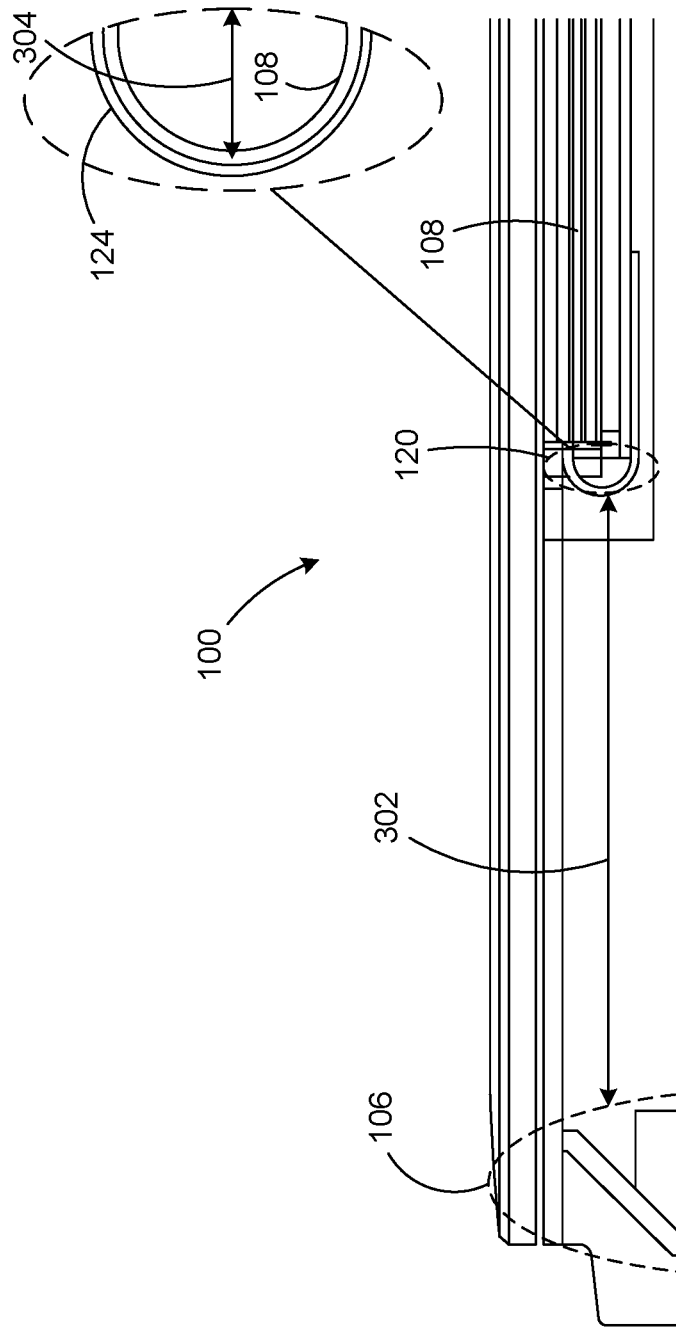
FIG. 3A
FIG. 3B

RADIO FREQUENCY SHIELDING USING A TOUCH ON ENCAPSULATION LAYER

BACKGROUND

One of the current trends in developing electronic devices to meet customer's demands is slimming a device body, that is, reducing a thickness of the electronic device as well as extending a display to the outermost edges of the device body. However, as electronic devices become thinner, this creates challenges in maintaining performance of structures internal to the electronic device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A display panel that includes a display area and a non-display area is described. The display panel includes a flexible substrate, a touch metal layer, and a metal layer between the flexible substrate and the touch metal layer. Each of the display area and the non-display area include the flexible substrate, the touch metal layer, and the metal layer. The metal layer includes signal lines for transmitting signals between the display area and the non-display area. The non-display area includes a bending area with the touch metal layer being disposed on the metal layer in the non-display area to shield noise from signals transmitted through the signal lines in the bending area from the antenna. The display area includes light emitting diodes and a thin film encapsulation layer disposed between the touch metal layer and the metal layer.

BRIEF DESCRIPTION OF THE DRAWINGS

The present description will be better understood from the following detailed description read in light of the accompanying drawings, wherein:

FIG. 3A is a diagram illustrating a cross-sectional view of a display device;

FIG. 3B is a magnified view of a bending area of a display device of FIG. 3A;

Corresponding reference characters indicate corresponding parts throughout the drawings. In FIGS. 1 to 9, the systems are illustrated as schematic drawings. The drawings may not be to scale.

DETAILED DESCRIPTION

Figure 1:
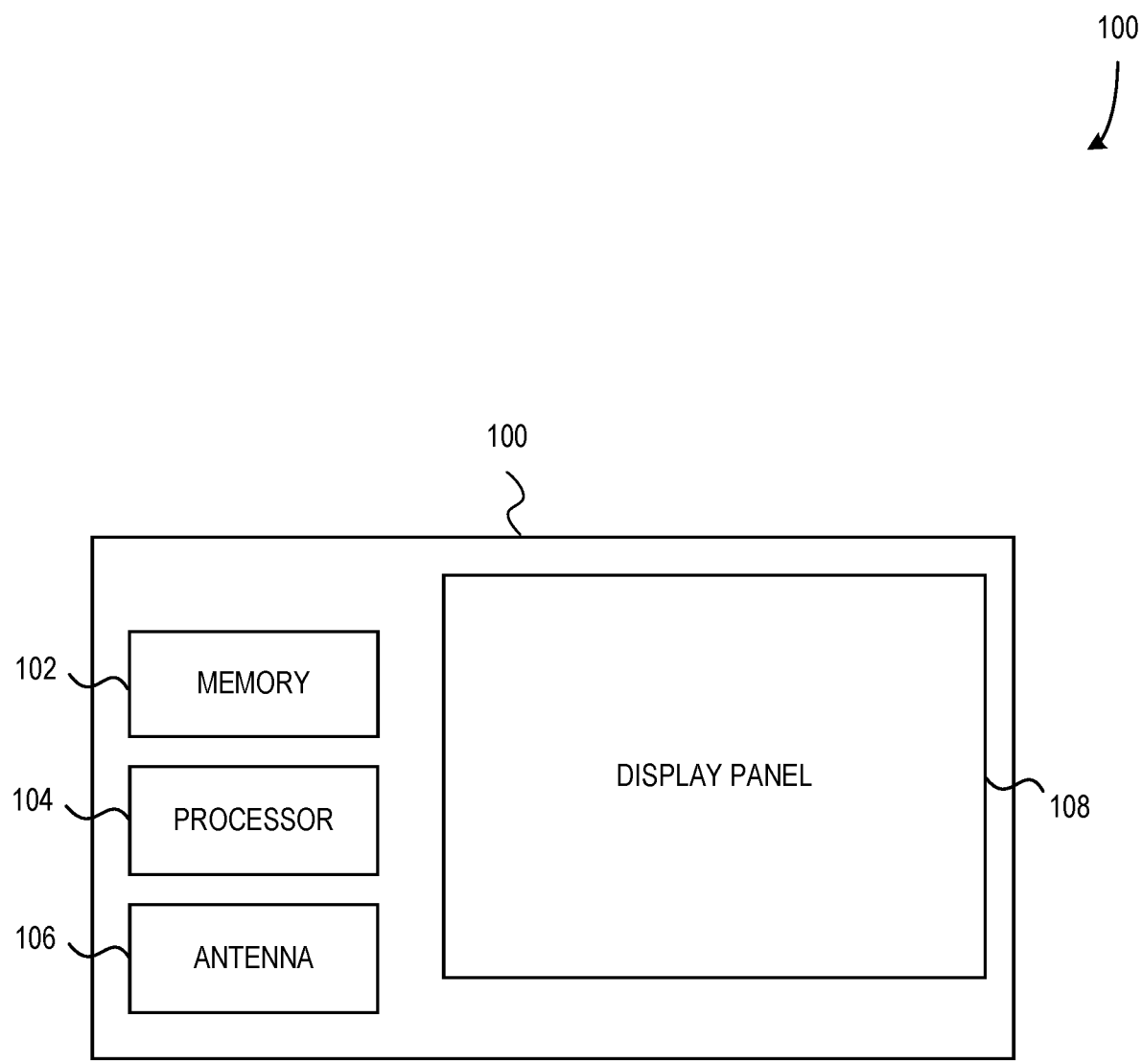
FIG. 1 is a block diagram illustrating a display device.

Aspects of the disclosure provide at least a display panel and a method of manufacturing the display panel. The display panel includes a display area and a non-display area. The display area includes an active area configured to display images and sense touch input. In some examples, the active area is the entire display area and includes a portion of a peripheral area surrounding the display area. In other examples, only a portion of the display area is included in the active area. Touch inputs on the active area are sensed using a touch-on-encapsulation layer (TOE) structure in which one or more touch metals are positioned on an encapsulation layer as a wire mesh. The disclosure addresses the technical challenges, among others, of efficiently shielding signal lines in a bending area of the non-display area of the display panel from an antenna despite the existing limitations associated with a distance between the antenna of a display and a bending area of the display panel becoming shorter as the display becomes more slim and as the display area of the display panel extends to the outermost edges of the display. For example, as a size of a bottom panel of the device becomes more narrow, and a distance between an antenna formed on a bottom edge of the device and signal lines from the display becomes closer, signal noise generated from the signal lines negatively effects performance of the antenna, and signal noise generated from the antenna negatively affects display and touch functions. Conventionally, signal lines are shielded with a frame structure such as copper tape to shield the signal lines from the antenna. However, applying copper tape to the signal lines takes up space, requires additional steps in the manufacturing of the device, and is costly.

The disclosure describes an extension or application of a touch metal to the bending area of the display panel to shield noise from signals transmitted through signal lines in the bending area from the antenna. The inclusion of the touch metal on the bending area addresses at least the issues of expense, size, and complexity, as applying the touch metal to the bending area is substantially requires fewer steps an less materials in the manufacturing processes than shielding the signal lines with a frame structure such as copper. The disclosure further operates in an unconventional manner by forming the touch metal on the bending area of the non-display area of the display panel at a same time the touch metal is being formed on the display area of the display panel, thus reducing additional steps and costs associated with forming a shield with another material and in another manner. Further, applying the touch metal to a surface of the bending area in the display panel improves the functioning of the display device by shielding signals from signal lines in the bending area from causing interference with the antenna and/or shields signals transmitted by the antenna from negatively affecting the display panel, for example, causing touch and display malfunction and communication distortions.

In the drawings, the thicknesses of layers, films, panels, area, etc., may be exaggerated. For clarity, like reference numerals designate like elements throughout the specification. It will be understood that when an element such as a layer, film, area, or substrate is referred to as being "on" another element, it can be directly on the other element or intervening elements may also be present. In contrast, when an element is referred to as being "directly on" another element, there are no intervening elements present.

Hereinafter, a display device according to examples will be described in detail with reference to the accompanying drawings. The examples will be mainly described below with reference to an organic light-emitting diode (OLED) display, but may also be applied to other displays, such as active-matrix organic light emitting diode (AMOLED) and organic liquid crystal display (LCD).

FIG. 1 illustrates a block diagram of a display device 100. The display device 100 may be a stand-alone, operable display, a display module, or a display panel, to be integrated as a part of a device, such as a mobile phone, a smart phone, a table computer, a laptop computer, a game controller, a wearable electronic device and the like. The display device 100 may include a memory 102, a processor 104, an antenna 106, and a display panel 108, and/or any other suitable computing components to control a display of images via an integrated computing device. In other examples, a computing device (not shown) sends display instructions to the display device 100 to control the display of images thereon.

Figure 2:
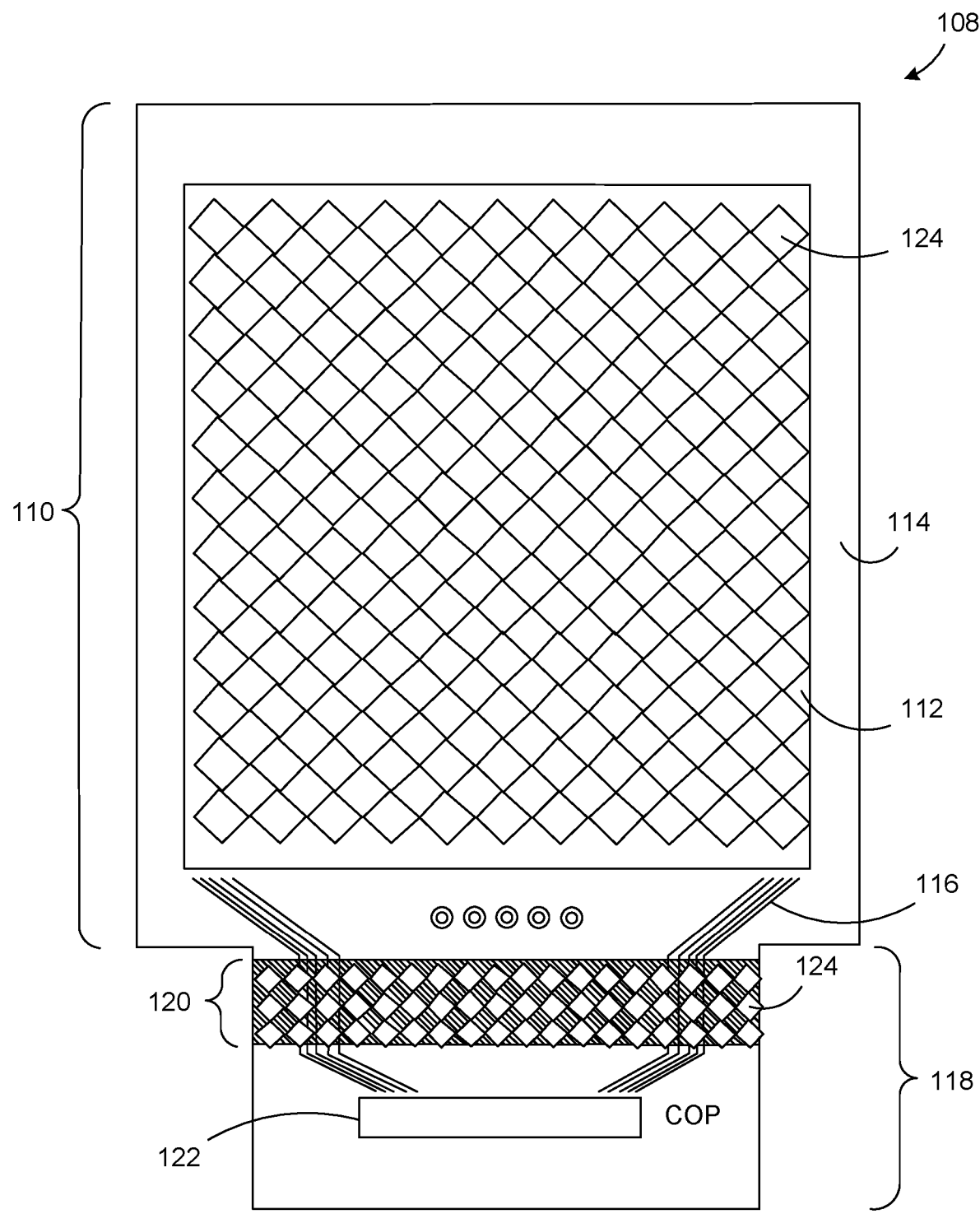
FIG. 2 illustrates a top plan view of a display panel.

With reference now to FIG. 2, FIG. 2 illustrates a plan view of the display panel 108 before a bending area 120 is bent. The display panel 108 includes a display area 110 comprising an active area 112, in which images are displayed, a peripheral area 114 surrounding the active area 112, and a wire area 116. The peripheral area 114 is a peripheral region surrounding the active area 112. That is, the peripheral area 114 is disposed around the active area 112. The display panel 108 further includes a non-display area 118 comprising the bending area 120 and a chip area 122. The bending area 120 is disposed adjacent to the peripheral area 114, and the chip area 122 is disposed adjacent to the bending area 120. The active area 112 comprises a touch metal layer 124 forming a touch active area and is formed as a wire mesh using a touch metal, such as, aluminum, copper, or molybdenum. The touch metal layer 124 is coupled to signal lines in the wire area 116 which transmit and/or receive signals to and from the touch metal layer 124 to a chip in the chip area 122. The chip area 122 includes a chip on panel structure or a chip on flex structure. Chip-on-Flex refers to the semiconductor assembly technology wherein the microchip or die is directly mounted on and electrically connected to a flexible circuit (e.g., a circuit built on a flexible substrate instead of a usual printed circuit board). Thus, in a chip-on-flex assembly, the microchip does not have to go through all the traditional assembly steps required for individual packaging. This simplifies the over-all process of designing and manufacturing a final product while improving performance as a result of shorter interconnection paths. Chip-on-flex thus enables space sayings, reduced weight, lower production cost, thermal durability, higher reliability from better heat distribution; shorter time-to-market, and geometrical and mechanical flexibility.

As explained in further detail below, the bending area 120 also include the touch metal layer 124 formed as a wire mesh to shield signal lines in the bending area 120 from an antenna (e.g., the antenna 106). A touch metal in the touch metal layer 124 is applied as a solid metal and then etched to generate the wire mesh in the bending area 120 and the active area 112.

With reference now to FIG. 3A, a cross-sectional view of a portion of the display device 100 is provided. As a distance 302 between the antenna 106 formed on an edge of the display device 100 and signal lines in the bending area 120 of the display panel 108 becomes closer, signal noise generated from signal lines in the bending area 120 negatively affects a performance of the antenna 106, and signal noise generated from the antenna 106 negatively affects performances of the display device 100, such as touch functions of the display panel 108. As such, applying the touch metal layer 124 (as shown in FIG. 3B) to a surface of the bending area 120 (e.g., a surface of the bending area 120 closest to the antenna 106, such as an outer surface of the bending area 120) shields signals from signal lines in the bending area 120 from causing interference with the antenna 106 and/or from signals transmitted by the antenna 106 from negatively affecting the display panel 108. As shown in FIG. 3B, the bending area 120 is bent around or underneath the display panel 108 forming a bending radius 304.

With reference back to FIG. 2, the wire mesh of the touch metal layer 124 in the active area 112 is shown to be different than the wire mesh of the touch metal layer 124 in the bending area 120. In one example, a size of openings in the wire mesh of the touch metal layer 124 in the bending area 120 are based at least in part on a noise frequency of signals transmitted through the signal lines. For example, the openings are smaller than a wavelength of radiation. In addition the wire mesh of the touch metal layer 124 on the bending area 120 prevents cracking on the touch metal layer 124 in the bending area 120. In other examples, the touch metal layer 124 in the bending area 120 is solid metal layer. In yet other examples, the mesh design and a size of the openings in the mesh of the touch metal layer 124 in the bending area is the same as in the touch metal layer 124 in the active area 112. By utilizing the touch metal layer 124 that is currently applied to the active area 112 as a shield for the bending area 120, an amount of space needed for a shield is reduced and no additional cost for additional materials are incurred for shielding the signal lines in the bending area 120. In addition, by applying the touch metal layer 124 as the shield to the bending area 120 at a same time the touch metal layer 124 is applied to the active layer, time of manufacturing the display panel is also saved.

Figure 4:
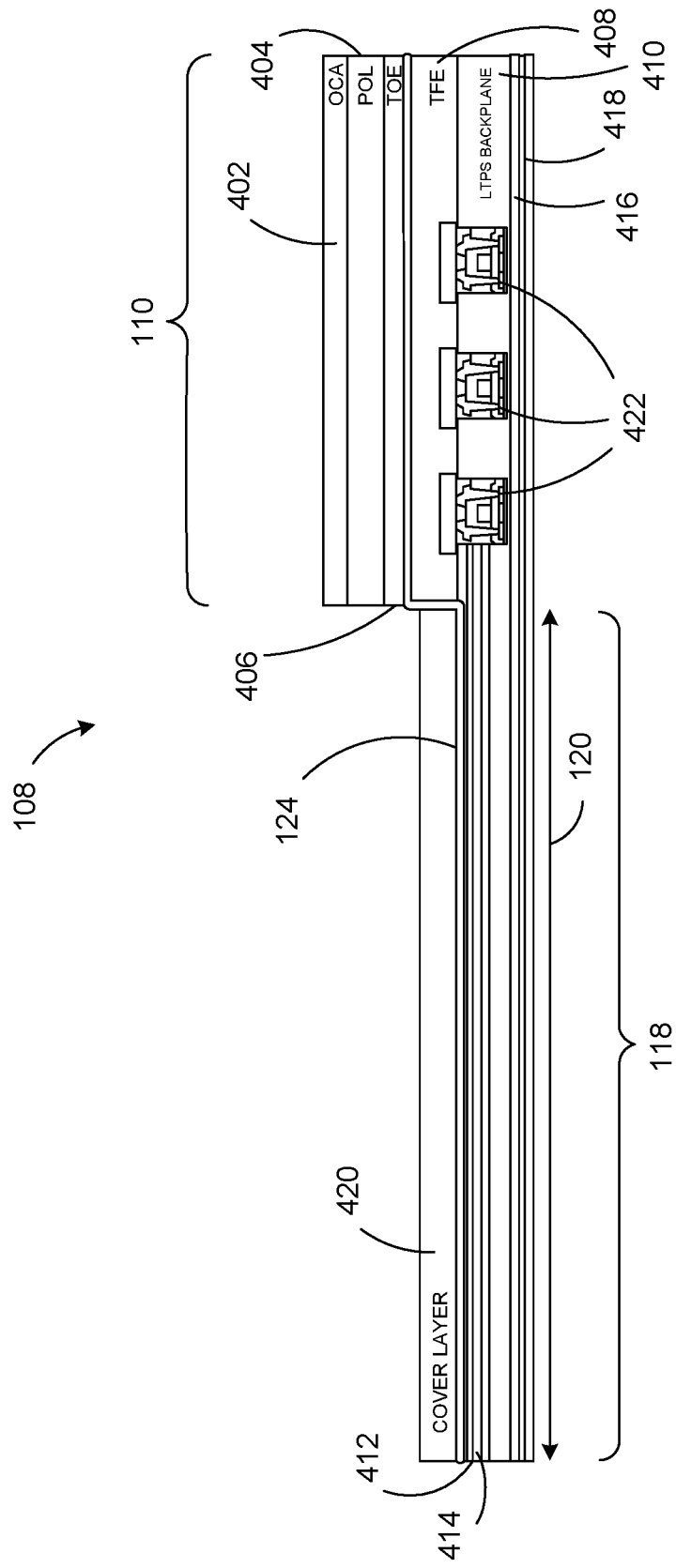
FIG. 4 is a cross-sectional view of a display panel.

With reference now to FIG. 4, the display area 110 of the display panel 108 and the non-display area 118 of the display panel 108 includes a stack of layers. As illustrated in FIG. 4, the layers of the display panel 108 are layered in a sense that they lie on top of each other, thereby forming a stack of layers. Each of the layers is formed as a generally sheet-like or plate-like in which the width is defined, e.g., in a "perpendicular" or "vertical" direction. In practice, the width, or more generally the lateral dimensions, may be, e.g., in the range of some centimeters to some tens of centimeters, whereas the thickness of each element may be, e.g., some tens of micrometers. However, these numbers are merely exemplary and the thicknesses of the display elements of the display panel 108 may vary.

The layers of the display area 110 of the display panel 108 include an optically clear adhesive (OCA) 402 or, in some examples, an optically clear resin (OCR). The display area 110 of the display panel 108 further includes a polarizer 404, a touch-on-encapsulation layer 406 (which includes the touch metal layer 124), a thin film encapsulation layer (TFE) 408, and a low temperature polysilicon (LTPS) backplane 410. The LTPS backplane 410 includes metal layers 412 and 414 that extend from the display area 110 to the non-display area 118 as well as light emitting diodes 422, forming a metal signal line. The metal layers 412 and 414 in the LTPS backplane 410 include touch metal signal lines, data signal lines, power lines, etc. The metal layers 412 and 414 may be made include aluminum, copper, or molybdenum. Signals of the touch metal signal lines are sent and/or received by a chip in the chip area 122. A polyimide (PI) substrate 416/418 extends across each of the non-display area 118 and the display area 110 of the display panel 108. The PI substrate 416, 418 being a flexible substrate enables the bending area 120 to bend to form a desired bend radius. As described in further detail with reference to FIG. 5, the metal layers 412 and 414 are also used as a ground for the touch metal layer.

The layers of the display panel 108 of FIG. 4 are merely examples of possible layers and/or elements. The display panel 108 described herein may comprise any number of layers/elements, as long as the layer/elements include at least the touch metal layer 124 with a respective grounding layer/metal, and at least one display element.

Figure 5:
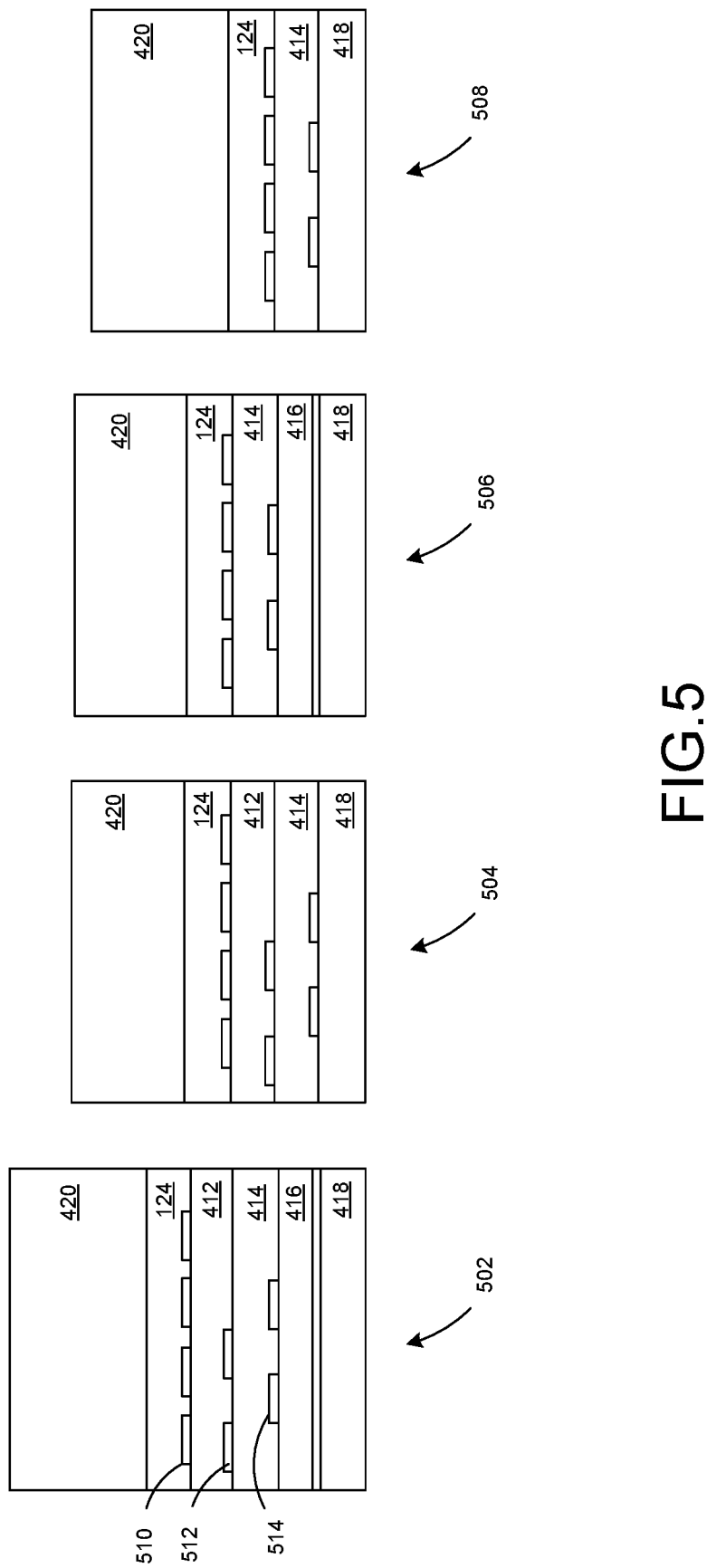
FIG. 5 illustrates various cross-sectional views of a non-display area of a display panel.

With reference now to FIG. 5, a cross-sectional view of exemplary structures, 502, 504, 506, and 508 of the bending area 120 is provided. In some examples, the bending area comprises one or more metal layers and one or more polyimide layers. Further, the layers provided herein are merely exemplary and other layers may be added or removed from the exemplary structures shown in FIG. 5. For example, the structure 502 includes two metal layers and two polyimide layers. More specifically, the structure 502 includes a cover layer 420 (e.g., organic material such as polymer), the touch metal layer 124 comprising a touch metal 510, the metal layer 412 comprising a metal 512, such as aluminum, copper, or molybdenum as a metal signal line, the metal layer 414 comprising a metal 514, such as aluminum, copper, or molybdenum as a metal signal line, the polyimide substrate 416, and the polyimide substrate 418.

The structure 504 includes two metal layers and only one polyimide layer. More specifically, the structure 504 includes the cover layer 420, the touch metal layer 124 comprising the touch metal 510, the metal layer 412 comprising the metal 512, the metal layer 414 comprising the metal 514, and the polyimide layer 418.

The structure 506 includes only one metal layer and two polyimide layers. More specifically, the structure 506 includes the cover layer 420, the touch metal layer 124 comprising the touch metal 510, the metal layer 414 comprising the metal 514, the polyimide substrate 416, and the polyimide substrate 418.

Further, the structure 508 includes only one metal layer and only one polyimide layer. More specifically, the structure 508 includes the cover layer 420, the touch metal layer 124 comprising the touch metal 510, the metal layer 414 comprising the metal 514, and the polyimide layer 418.

While structures 502, 504, 506, and 508 provide specific embodiments of the bending area 120, other example could include additional layers, fewer layers, and/or different layers than what is described in structures 502, 504, 506, and 508.

Figure 6:
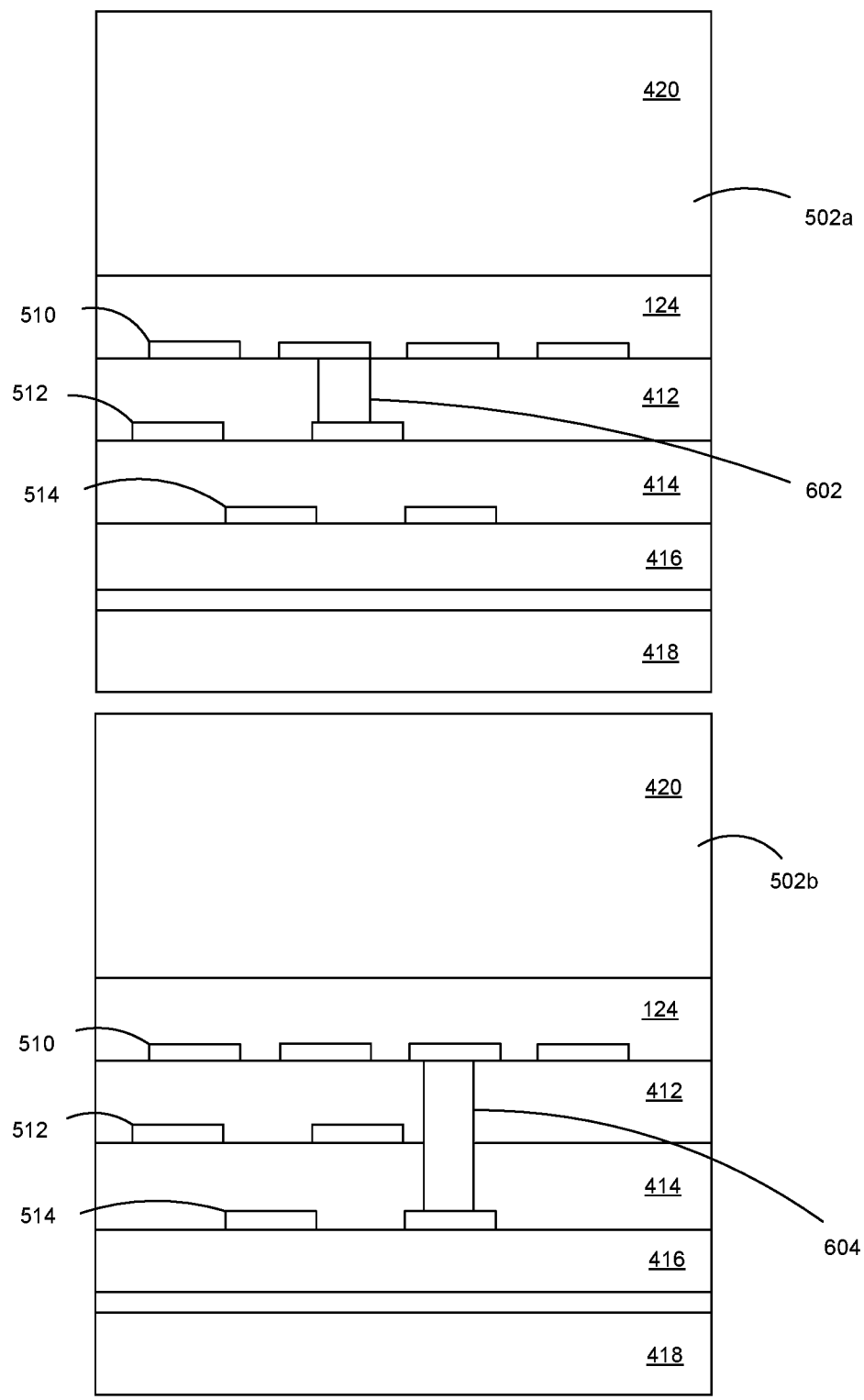
FIG. 6 illustrates a grounding within various cross-section views of a non-display area.

With reference now to FIG. 6, the structure 502 is provided to illustrate grounding between the touch metal 510 and one of the metals 512 and 514 in the metal layers 412 and 414. As shown in structure 502(a), a via 602 connects the touch metal 510 to the metal 512 in the metal layer 412. Further, as shown in structure 502(b), a via 604 connect the touch metal 510 to the metal 514 in the metal layer 414. A ground between the touch metal 510 and one of the metals 512 and 514 is provided to eliminate floating. That is, without a proper ground, a noise, such as a "common mode noise" that is electrical noise/hash that is trying to get back to ground "floats" around causing issues in the display panel 108 as the noise attempts to find a way to get to ground, which can eventually cause components in the display device 100 to fail prematurely. While FIG. 6 illustrates grounding between the touch metal 510 and one of the metals 514 or 516 using vias 602 or 604, multiple vias may be used. For example, both vias 602 and 604 may be used. In addition, the touch metal 510 may be coupled to other metals in or below the display panel 108.

Figure 7:
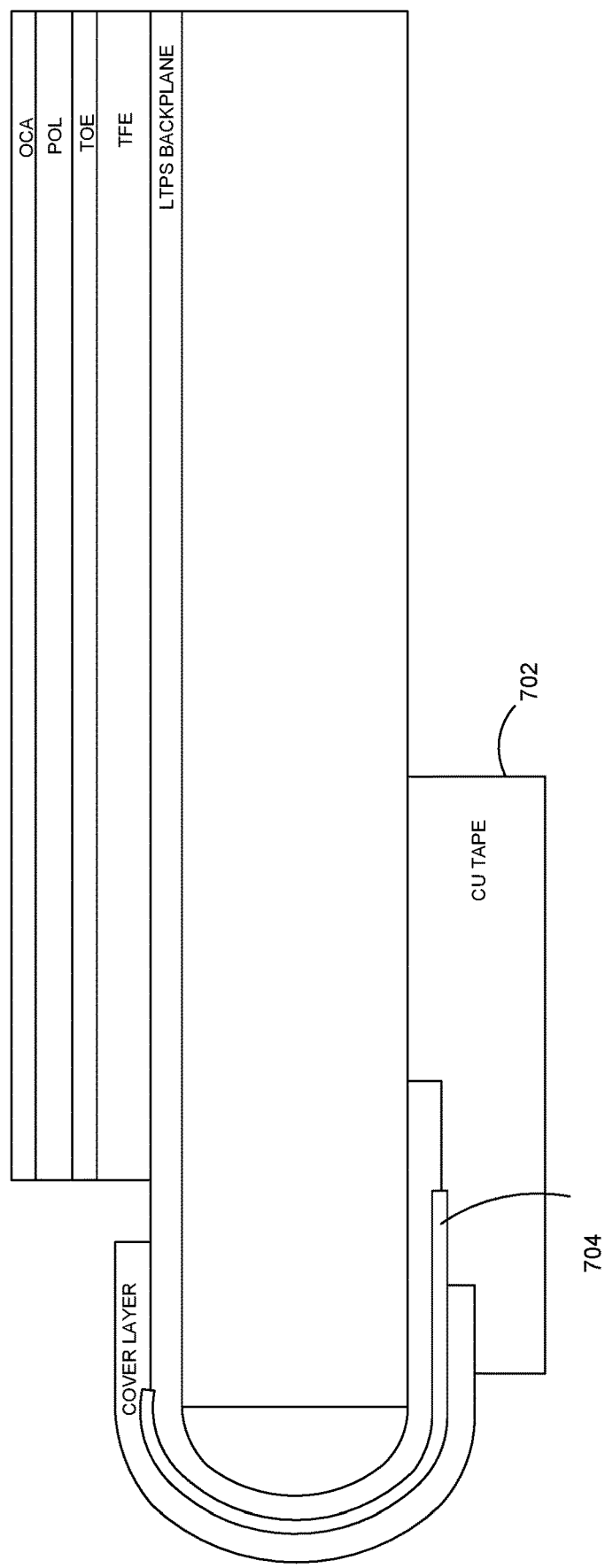
FIG. 7 is a cross-sectional view of a touch metal in a bending area of the non-display area of the display panel being grounded to a ground in a display area of the display panel.

With reference now to FIG. 7, an additional example of grounding the touch metal 510 is provided. For example, a copper tape 702 or other metal may be provided beneath the display area 110 of the display panel 108. As such, the touch metal 510 in the touch metal layer 124 on the bending area 120 is extended to contact the copper tape 702 at area 704.

Figure 8:
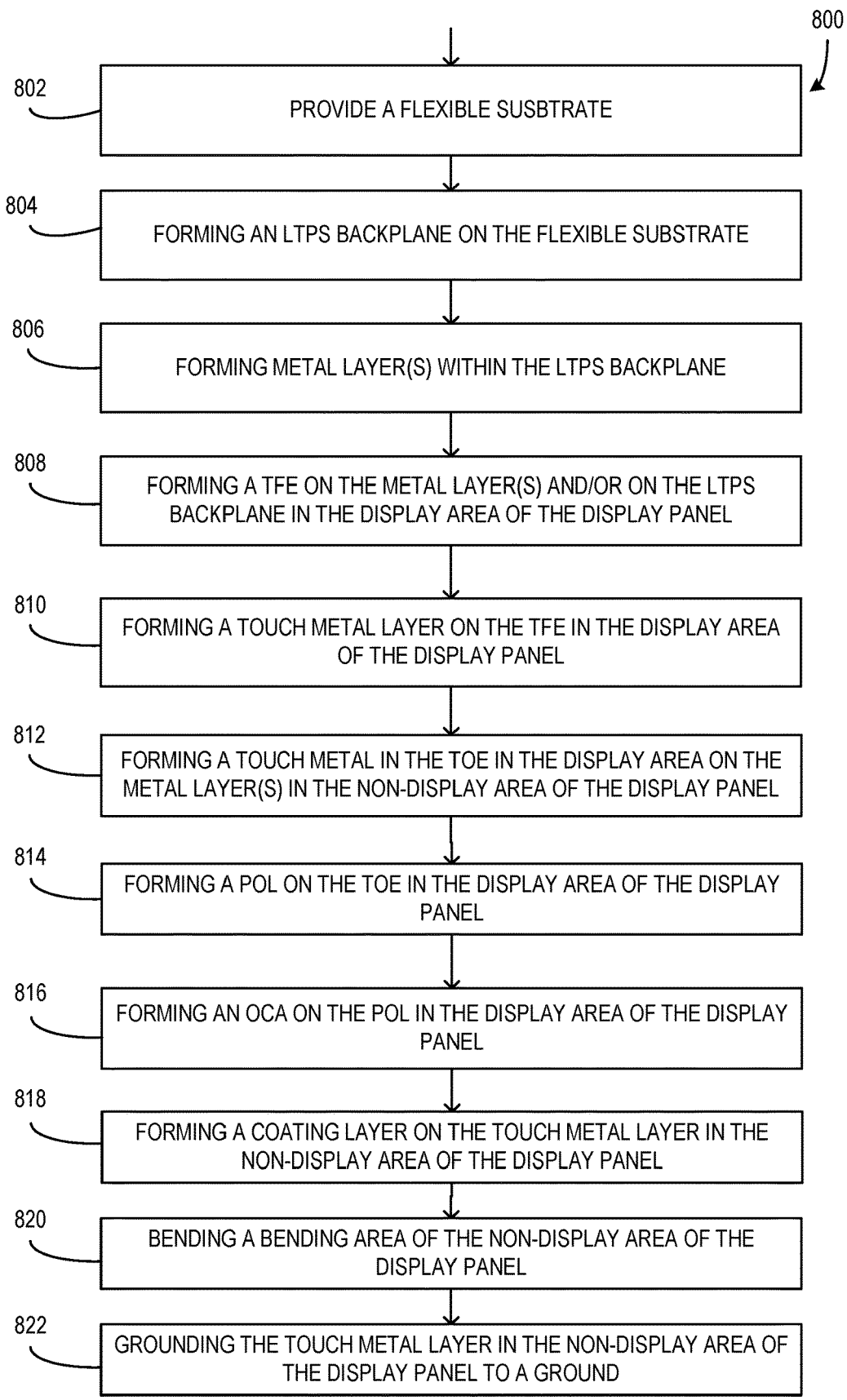
FIG. 8 is a flowchart of a method for manufacturing a display panel.

FIG. 8 is a schematic flowchart of a method for manufacturing the display panel 108. With reference to FIG. 8, the method includes following operations. At 802, a flexible substrate is provided. The flexible substrate comprises one or more layers of a PI substrate, such as PI substrates 416, 418, with one or more layers, such as a buffer layer, therebetween. At 804, an LTPS backplane, such as the LTPS backplane 410 is formed, in the display area 110 and the non-display area 118, on the flexible substrate. At 806, source/drain metal layers, such as the source/drain metal layers 412 and 414 are formed, in the display area 110 and the non-display area 118, within the LTPS backplane. At 808, a thin film encapsulation (TFE), such as the TFE 408 is formed, in the display area 110, on the source/drain metal layers and/or the LTPS backplane to provide a protective barrier For example, OLED materials are extremely sensitive to contamination from water vapor and oxygen, which results in cathode oxidation and degradation of the organic luminance materials. TFE provides a protective barrier to, for example, light emitting diodes 422, from these contaminants. At 810, a touch metal layer, such as the TOE 406, is formed on the TFE in the in the display area 110. At 812, a touch metal, such as the touch metal 510 is formed in the TOE in the display area and on the source/drain metal layer in the non-display area 118. In one example, the touch metal 510 is formed as a wire mesh. In another example, the touch metal 510 is formed as a particular wire mesh in the TOE in the display area 110 and as another/different wire mesh on the source/drain metal layer in the non-display area 118. For example, while a wire mesh of the touch metal 510 in the TOE in the display area 110 is designed to enable touch input, the wire mesh of the touch metal 510 in the bending area 120 in the non-display area 118 is designed to shield signal noise from an antenna (e.g., the antenna 106) in the display device 100. Thus, a size of openings in the touch metal 510 in the display area and in the non-display area may differ from one another not only in size, but also in shape. For example, a size of the openings in the touch metal 510 in the non-display area 118 are smaller than a wavelength of radiation emitted from signal lines in the source/drain metal layer. As such, a wire mesh of the touch metal 510 formed on the TOE is the display area 110 may have a pattern with openings that optimize a touch input. In addition, a wire mesh of the touch metal 510 formed on the bending area 120 in the non-display area 118 may have a pattern with openings that optimize shielding signal noise to/from the antenna. The openings in the touch metal 510 on either the TOE or the bending area may be circular, square, rectangular, hexagon or any other polygon or combination of polygons. Additional touch metal layers may also be formed over the touch metal 510 in the display area 110 and in the non-display area 118. While multiple touch metals may be utilized to enable touch input in the display area, multiple touch metals formed in the non-display area 118 may increase the shielding capabilities in the bending area 120.

With continued reference to FIG. 8, at 814 a POL, such as the POL 404 is formed on the TOE in the display area 110. At 816, an OCA, such as OCA 402 is formed on the POL in the display area 110. At 818, a cover layer, such as the cover layer 420 is formed on the touch metal layer in the non-display area. In one example, the cover layer 420 provides a layer of protection for the touch metal layer. At 820, a bending an area of the non-display area 118, such as the bending area 120, is bent under or around the flexible substrate to form a bend radius (e.g., the bend radius 304) such that the flexible substrate in a non-bend area of the non-display portion (e.g., in the chip area 122) faces the flexible substrate on the display area 110. At 822, the touch metal layer 124 in the non-display area 118 is grounded by connecting the touch metal layer 124 in the non-display area 118 to a metal in the metal layer using a via (e.g., as shown in FIG. 6).

Exemplary Operating Environment

Figure 9:
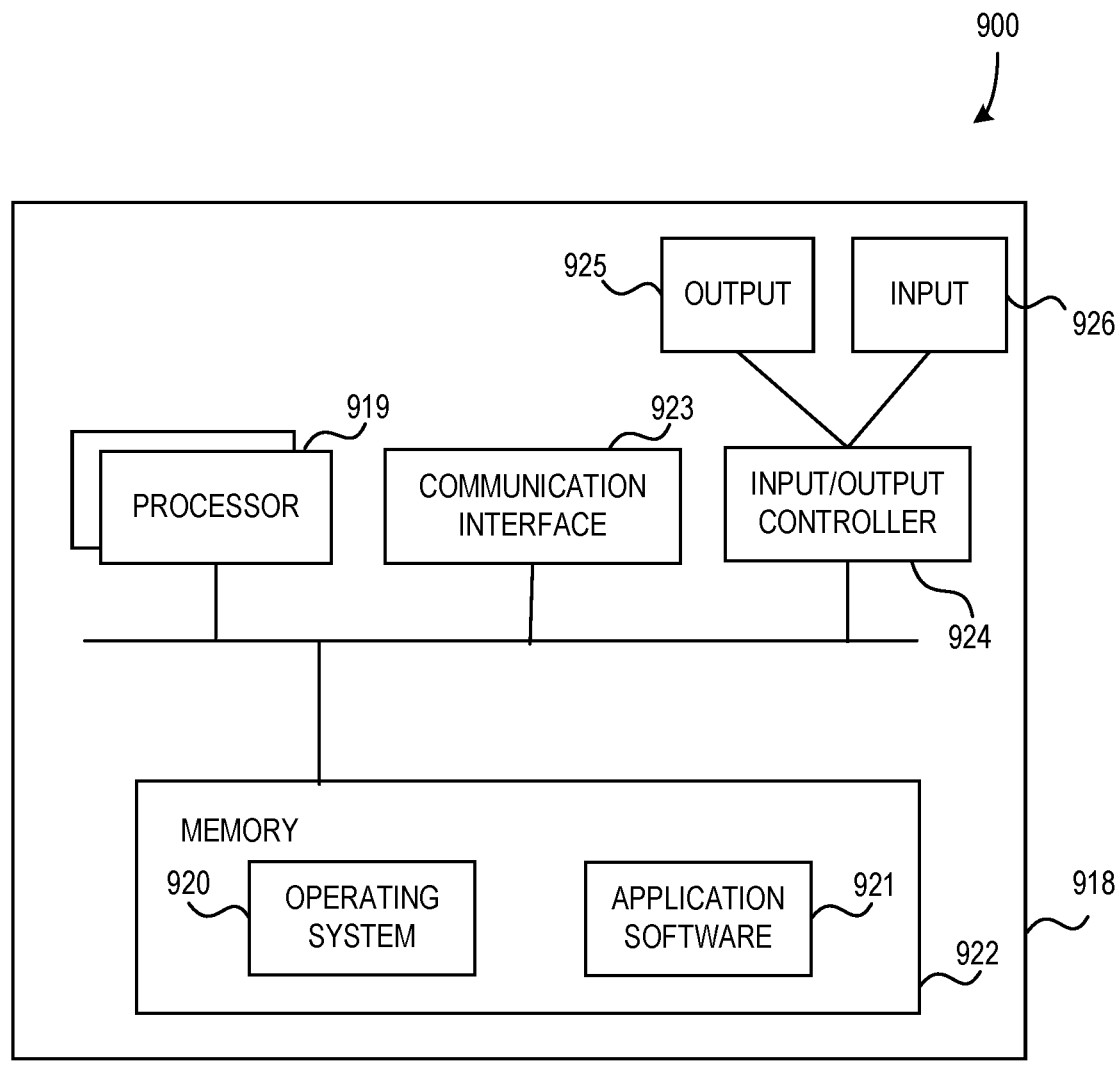
FIG. 9 illustrates an example computing apparatus as a functional block diagram.

The present disclosure is operable with a stand-alone display device (e.g., display device 100) or a display device integrated with a computing apparatus as a functional block diagram 900 in FIG. 9. In an embodiment, components of a computing apparatus 918 may be implemented as a part of an electronic device according to one or more embodiments described in this specification. The computing apparatus 918 comprises one or more processors 919 which may be microprocessors, controllers, or any other suitable type of processors for processing computer executable instructions to control the operation of the electronic device. Alternatively, or in addition, the processor 919 is any technology capable of executing logic or instructions, such as a hard-coded machine. Platform software comprising an operating system 920 or any other suitable platform software may be provided on the computing apparatus 918 to enable application software 921 to be executed on the device.

Computer executable instructions may be provided using any computer-readable media that are accessible by the computing apparatus 918. Computer-readable media may include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that the storage may be distributed or located remotely and accessed via a network or other communication link (e.g. using a communication interface 923).

The computing apparatus 918 may comprise an input/output controller 924 configured to output information to one or more output devices 925, for example a display or a speaker, which may be separate from or integral to the electronic device (e.g., such as display device 100). The input/output controller 924 may also be configured to receive and process an input from one or more input devices 926, for example, a keyboard, a microphone, or a touchpad. In one embodiment, the output device 925 may also act as the input device. An example of such a device may be a touch sensitive display. The input/output controller 924 may also output data to devices other than the output device, e.g. a locally connected printing device. In some embodiments, a user may provide input to the input device(s) 926 and/or receive output from the output device(s) 925.

According to an embodiment, the computing apparatus 918 is configured by the program code when executed by the processor 919 to execute specific operations and functionality. Alternatively, or in addition, the functionality can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although described in connection with an exemplary computing system environment, examples of the disclosure are capable of implementation with numerous other general purpose or special purpose computing system environments, configurations, or display devices.

Examples of well-known computing systems, environments, and/or configurations that may be suitable for use with aspects of the disclosure include, but are not limited to, mobile or portable computing devices (e.g., smartphones), display devices, personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

An example display device comprises: an antenna; a display panel comprising: a flexible substrate; a touch metal layer; a metal layer between the flexible substrate and the touch metal layer; a display area; and a non-display area; each of the display area and the non-display area comprising the flexible substrate, the touch metal layer, and the metal layer, the metal layer comprising signal lines for transmitting signals between the display area and the non-display area; the non-display area further comprising: a bending area; and the touch metal layer being disposed on the metal layer in the non-display area to shield noise from signals transmitted through the signal lines in the bending area from the antenna; the display area further comprising: light emitting diodes; and a thin film encapsulation layer disposed between the touch metal layer and the source/drain metal layer in the display area.

An example display panel comprises: a flexible substrate; a touch metal layer; a metal layer between the flexible substrate and the touch metal layer; a display area; and a non-display area; each of the display area and the non-display area comprising the flexible substrate, the touch metal layer, and the metal layer, the metal layer comprising signal lines for transmitting signals between the display area and the non-display area; the non-display area further comprising: a bending area; and the touch metal layer being disposed on the metal layer in the non-display area to shield noise from signals transmitted through the signal lines in the bending area from an antenna; the display area further comprising: light emitting diodes; a thin film encapsulation layer disposed between the touch metal layer and the metal layer in the display area.

An example method of manufacturing a display panel having a display area and a non-display area comprises: providing a flexible substrate; forming, in the display area and the non-display area, a metal layer on the flexible substrate; forming, in the display area, a thin film encapsulation layer on the metal layer; forming a touch metal layer on the thin film encapsulation layer in the display area and on the metal layer in the non-display area; and bending an area of the non-display area under the flexible substrate to form a bend radius such that the flexible substrate on the bending area faces the flexible substrate on a non-bending area of the non-display area.

Alternatively, or in addition to the other examples described herein, examples include any combination of the following:
  wherein the touch metal layer is disposed on the display area and the non-display area as a mesh.
  wherein openings in the mesh disposed in the bending area of the non-display area have a size based at least in part on a wavelength being shielded from the antenna.
  wherein the first value factor and the second value factor are based at least in part on at least one of the following: a time at which the data was collected and a location with which the data is associated.
  wherein the touch metal layer is disposed on the display area as a first mesh and the non-display area as a second mesh that is different than the first mesh.
  wherein a touch metal in the touch metal layer in the non-display area is grounded to a metal in the metal layer using a via.
  wherein the non-display area further comprises a chip area comprising one or more chips, the chip area comprising a chip on panel structure or a chip on flex structure.
  wherein the touch metal layer transmits a touch signal from a touch metal in the touch metal layer in the display area to the one or more chips.

Alternatively, or in addition to the other examples described herein, examples include any combination of the following:
  further comprising grounding the touch metal layer in the non-display area by connecting the touch metal layer in the non-display area to a metal in the metal layer using a via.
  wherein the touch metal layer is formed on the display area and the non-display area as a mesh.
  wherein openings in the mesh disposed in the bending area of the non-display area have a size based at least in part on a wavelength of a signal transmitted through the signal lines in the bending area.
  wherein the touch metal layer is disposed on the display area as a first mesh and the non-display area as a second mesh that is different than the first mesh.
  causing the touch metal layer to face an antenna to shield a signal transmitted through the signal lines in the bending area from the antenna by forming the touch metal layer on the bending area in the non-display area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for shielding an antenna using a touch metal layer on a bending area of a display panel.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:
1. A display device comprising:
  an antenna;
  a display panel comprising:
    a flexible substrate;
    a touch metal layer;
    a metal layer between the flexible substrate and the touch metal layer;
    a display area; and
    a non-display area;

each of the display area and the non-display area comprising the flexible substrate, the touch metal layer, and the metal layer, the metal layer comprising signal lines for transmitting signals between the display area and the non-display area;

the non-display area further comprising:
 a bending area; and
 the touch metal layer being disposed on the metal layer in the non-display area to shield noise from signals transmitted through the signal lines in the bending area from the antenna;

the display area further comprising:
 light emitting diodes; and
 a thin film encapsulation layer disposed between the touch metal layer and the metal layer in the display area.

2. The display device of claim 1, wherein the touch metal layer is disposed on the display area and the non-display area as a mesh.

3. The display device of claim 2, wherein openings in the mesh disposed in the bending area of the non-display area have a size based at least in part on a wavelength being shielded from the antenna.

4. The display device of claim 1, wherein the touch metal layer is disposed on the display area as a first mesh and the non-display area as a second mesh that is different than the first mesh.

5. The display device of claim 1, wherein a touch metal in the touch metal layer in the non-display area is grounded to a metal in the metal layer using a via.

6. The display device of claim 1, wherein the non-display area further comprises a chip area comprising one or more chips, the chip area comprising a chip on panel structure or a chip on flex structure.

7. The display device of claim 6, wherein the touch metal layer transmits a touch signal from a touch metal in the touch metal layer in the display area to the one or more chips.

8. A display panel comprising:
 a flexible substrate;
 a touch metal layer;
 a metal layer between the flexible substrate and the touch metal layer;
 a display area; and
 a non-display area;
 each of the display area and the non-display area comprising the flexible substrate, the touch metal layer, and the metal layer, the metal layer comprising signal lines for transmitting signals between the display area and the non-display area;
 the non-display area further comprising:
  a bending area; and
  the touch metal layer being disposed on the metal layer in the non-display area to shield noise from signals transmitted through the signal lines in the bending area from an antenna;
 the display area further comprising:
  light emitting diodes; and
  a thin film encapsulation layer disposed between the touch metal layer and the metal layer in the display area.

9. The display panel of claim 8, wherein the touch metal layer is disposed on the display area and the non-display area as a mesh.

10. The display panel of claim 9, wherein openings in the mesh disposed in the bending area of the non-display area have a size based at least in part on a wavelength of signals transmitted through the signal lines in the bending area.

11. The display panel of claim 8, wherein the touch metal layer is disposed on the display area as a first mesh and the non-display area as a second mesh that is different than the first mesh.

12. The display panel of claim 8, wherein a touch metal in the touch metal layer in the non-display area is grounded to a metal in the metal layer using a via.

13. The display panel of claim 8, wherein the non-display area further comprises a chip area comprising one or more chips, the chip area comprising a chip on panel structure or a chip on flex structure.

14. The display panel of claim 13, wherein the touch metal layer transmits a touch signal from a touch metal in the touch metal layer in the display area to the one or more chips.

15. A method of manufacturing a display panel, the display panel having a display area and a non-display area, the method comprising:
 providing a flexible substrate;
 forming, in the display area and the non-display area, a metal layer on the flexible substrate;
 forming, in the display area, a thin film encapsulation layer on the metal layer;
 forming a touch metal layer on the thin film encapsulation layer in the display area and on the metal layer in the non-display area; and
 bending an area of the non-display area under the flexible substrate to form a bend radius such that the flexible substrate on a bending area faces the flexible substrate on a non-bending area of the non-display area.

16. The method of manufacturing the display panel of claim 15, further comprising grounding the touch metal layer in the non-display area by connecting the touch metal layer in the non-display area to a metal in the metal layer using a via.

17. The method of manufacturing the display panel of claim 15, wherein the touch metal layer is formed on the display area and the non-display area as a mesh.

18. The method of manufacturing the display panel of claim 17, wherein openings in the mesh disposed in the bending area of the non-display area have a size based at least in part on a wavelength of a signal transmitted through the signal lines in the bending area.

19. The method of manufacturing the display panel of claim 15, wherein the touch metal layer is disposed on the display area as a first mesh and the non-display area as a second mesh that is different than the first mesh.

20. The method of manufacturing the display panel of claim 15, further comprising causing the touch metal layer to face an antenna to shield a signal transmitted through the signal lines in the bending area from the antenna by forming the touch metal layer on the bending area in the non-display area.

* * * * *